United States Patent
Zhao et al.

(10) Patent No.: US 12,544,829 B2
(45) Date of Patent: Feb. 10, 2026

(54) METHOD OF PREPARING NANO-POROUS POWDER MATERIAL

(71) Applicant: SHANGHAI FUTING TECHNOLOGY CO., LTD, Shanghai (CN)

(72) Inventors: Yuanyun Zhao, Guangdong (CN); Chuntao Chang, Guangdong (CN); Chengliang Zhao, Guangdong (CN)

(73) Assignee: SHANGHAI FUTING TECHNOLOGY CO., LTD, Shanghai (CN)

( * ) Notice: Subject to any disclaimer, the term of this patent is extended or adjusted under 35 U.S.C. 154(b) by 404 days.

(21) Appl. No.: 18/011,035

(22) PCT Filed: Dec. 17, 2020

(86) PCT No.: PCT/CN2020/137354
§ 371 (c)(1),
(2) Date: Dec. 16, 2022

(87) PCT Pub. No.: WO2021/253766
PCT Pub. Date: Dec. 23, 2021

(65) Prior Publication Data
US 2023/0321720 A1   Oct. 12, 2023

(30) Foreign Application Priority Data
Jun. 16, 2020   (CN) .................. 202010545646.3

(51) Int. Cl.
*B22F 1/07* (2022.01)
*B22F 1/142* (2022.01)
(Continued)

(52) U.S. Cl.
CPC ............... *B22F 1/07* (2022.01); *B22F 1/142* (2022.01); *B22F 9/04* (2013.01);
(Continued)

(58) Field of Classification Search
None
See application file for complete search history.

(56) References Cited

U.S. PATENT DOCUMENTS

| | | | | |
|---|---|---|---|---|
| 5,476,535 A | * | 12/1995 | Khasin | B22F 9/16 216/102 |
| 2015/0184309 A1 | | 7/2015 | Zhang et al. | |
| 2017/0335427 A1 | * | 11/2017 | Jarry | B22D 1/002 |

FOREIGN PATENT DOCUMENTS

| | | |
|---|---|---|
| CN | 103317141 A | 9/2013 |
| CN | 104928518 A | 9/2015 |

(Continued)

OTHER PUBLICATIONS

English translation of CN 105648254 (originally publshed Jun. 8, 2016), obtained from PE2E search.*
(Continued)

*Primary Examiner* — George Wyszomierski

(57) ABSTRACT

The present disclosure relates to a method of preparing a nano-porous powder material. The method includes: firstly removing A in the alloy $A_xT_y$ by using an ultrasonically-assisted de-alloying method to prepare a nano-porous T coarse powder, and then, allowing the nano-porous T coarse powder to perform M-ization reaction with a gas reactant containing M to obtain a nano-porous T-M coarse powder, and finally, further crushing the nano-porous T-M coarse powder using a jet mill to obtain a nano-porous T-M fine powder. The method can achieve low-cost mass production of the nano-porous T-M fine powder, bringing broad application prospects.

10 Claims, 1 Drawing Sheet

(51) Int. Cl.
  *B22F 9/04* (2006.01)
  *C01B 6/02* (2006.01)
  *C01B 6/24* (2006.01)
  *C01B 21/06* (2006.01)
  *C01B 21/076* (2006.01)
  *C01G 3/02* (2006.01)
  *C01G 53/04* (2006.01)

(52) U.S. Cl.
  CPC ..... *B22F 2009/044* (2013.01); *B22F 2203/11* (2013.01); *B22F 2203/13* (2013.01); *B22F 2304/058* (2013.01); *B22F 2304/10* (2013.01); *C01B 6/02* (2013.01); *C01B 6/24* (2013.01); *C01B 21/06* (2013.01); *C01B 21/0602* (2013.01); *C01B 21/076* (2013.01); *C01G 3/02* (2013.01); *C01G 53/04* (2013.01)

(56) References Cited

FOREIGN PATENT DOCUMENTS

| CN | 105648254 | A | * | 6/2016 |
| CN | 106811750 | A | | 6/2017 |
| CN | 107419128 | A | * | 12/2017 |
| CN | 111634938 | A | | 6/2020 |

OTHER PUBLICATIONS

English translation of CN 106811750 (originally publshed Jun. 9, 2017), obtained from PE2E search.*
English translation of CN 107419128 (originally published Dec. 1, 2017), obtained from PE2E search.*
International Search Report of PCT/CN2020/137354, mailed Mar. 17, 2021.
Written Opinion of PCT/CN2020/137354, mailed Mar. 17, 2021.
Xiangrong Ren et al., "Preparation of Nanoporous Ni and NiO and Their Electrocatalytic Activities for Oxygen Evolution Reaction", Chemical Journal of Chinese Universities, vol. 41, No. 1, Jan. 31, 2020.
Zhou Qi et al., "Preparation and Hydrogen Evolution Properties of Nanoporous Ni, Ni—Mo Alloys and Their Oxides" Chinese Journal of Inorganic Chemistry, vol. 34, No. 12, Dec. 31, 2018, Abstract only.
Bin Zheng, "Preparation and Electrochemical Performance of Nanoprous Binary Metal Oxides by Dealloying", Chinese Master's Theses Full-Text Database, Engineering Technology I, No. 11, Nov. 15, 2016, Abstract only.

* cited by examiner

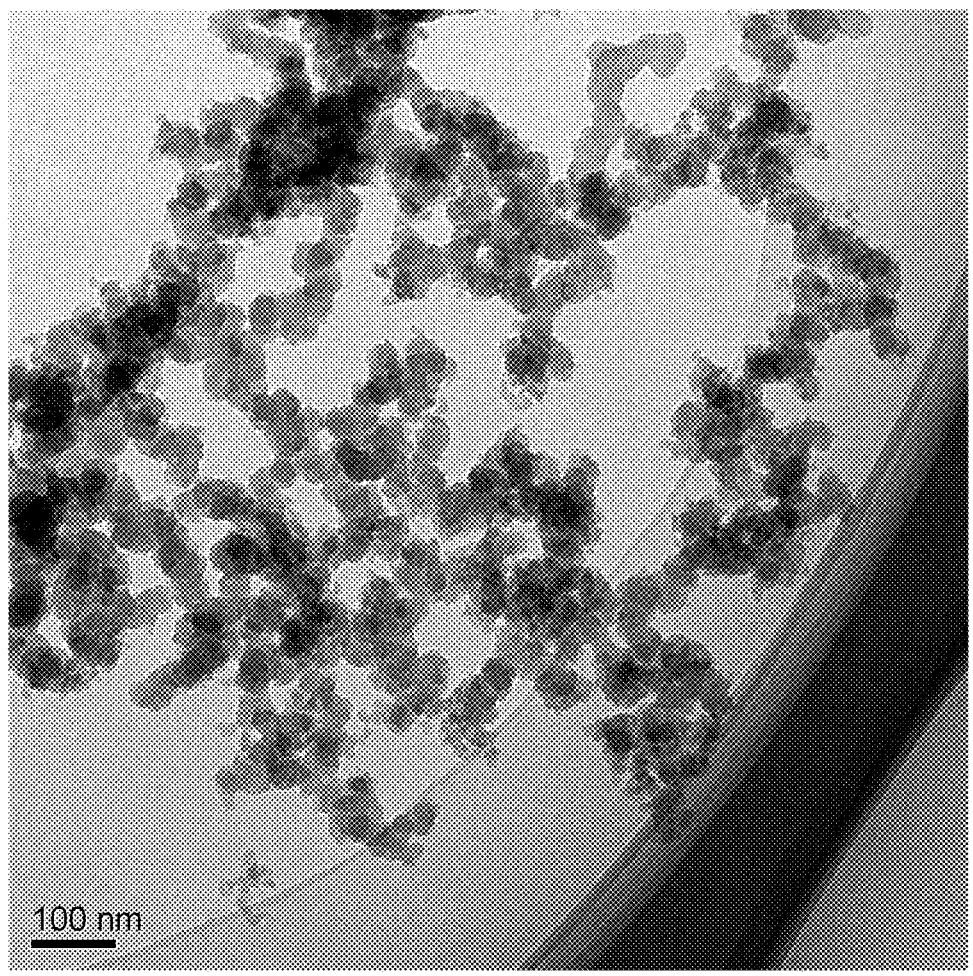

METHOD OF PREPARING NANO-POROUS POWDER MATERIAL

CROSS-REFERENCE TO RELATED APPLICATIONS

This Application is a national stage application of PCT/CN2020/137354. This application claims priorities from PCT Application No. PCT/CN2020/137354, filed Dec. 17, 2020, and from the Chinese patent application 202010545646.3 filed Jun. 16, 2020, the content of which are incorporated herein in the entirety by reference.

TECHNICAL FIELD

The present disclosure relates to the field of nano-material technologies, and in particular to a method of preparing a nano-porous powder material.

BACKGROUND

Nano-porous materials have important applications in catalysis, new energy, powder metallurgy, ceramics, photo-electricity, and the like due to their large specific surface area, high porosity, and relatively uniform nano-pores. At present, nano-porous materials are mainly used for the preparation of bulk nano-porous metal materials by a de-alloying method. The invention patent with the application number 201510862608.X relates to a method of preparing nano-porous metal particles by using an ultrasonically-assisted de-alloying method, which is only limited to preparing nano-porous metal particles with a particle size of 0.1 µm to 10 µm by using two-times de-alloying with an amorphous alloy as a precursor under the assistance of ultrasonic treatment. Nowadays, it is seldom reported that brittle nano-porous oxide particles, nitride particles, hydride particles, and the like are prepared using the de-alloying method.

SUMMARY

In view of the foregoing, it is necessary to provide a feasible and easily-operated method of preparing a nano-porous powder material.

The present disclosure provides a method of preparing a nano-porous powder material, including:

preparing a precursor alloy $A_xT_y$, where x and y represent atomic percentage contents of various elements, and $0.1\% \leq y \leq 50\%$, $x+y=100\%$; by using an ultrasonically-assisted de-alloying method, removing an element A in the alloy $A_xT_y$ to obtain a primarily-ultrasonicated nano-porous T coarse powder;

allowing the nano-porous T coarse powder to contact with a gas containing M under a given temperature to enable all or part of a constituent element T in the nano-porous T coarse powder to perform M-ization reaction with the M to obtain a nano-porous T-M coarse powder;

passing the nano-porous T-M coarse powder through a jet mill to undergo secondary crushing to produce a nano-porous T-M fine powder.

Furthermore, in the precursor alloy $A_xT_y$, T includes but is not limited to at least one of Be, B, Si, Ti, V, Cr, Mn, Fe, Co, Ni, Cu, Ge, Zr, Nb, Mo, Ag, Au, Pt, Pd, Hf, Ta, W, Bi; A includes but not limited to at least one of Li, Na, Mg, Al, K, Ca, Zn, Ga, Rb, Sn, Pb, Mn, Fe, Co, Ni, Cu, RE (rare earth element); and in the precursor alloy $A_xT_y$, T exists by combining with A into an intermetallic compound phase or amorphous phase.

Furthermore, the precursor alloy can be obtained in the following manner weighing alloy raw materials based on a ratio; fully melting the alloy raw materials to obtain an alloy melt, and then preparing the precursor alloy using a rapid solidification method; where a solidification rate of the alloy melt is 0.1 K/s to $10^7$ K/s, and a thickness of the precursor alloy is 5 µm to 50 mm.

Furthermore, the de-alloying method includes but is not limited to acid solution reaction de-alloying and base solution reaction de-alloying; when the acid solution reaction de-alloying is used, an acid solution is at least one of hydrochloric acid, sulfuric acid, nitric acid, phosphoric acid, perchloric acid, and acetic acid, and the acid solution has a concentration of 0.1 mol/L to 20 mol/L; when the base solution reaction de-alloying is used, a base solution is at least one of sodium hydroxide and potassium hydroxide, and the base solution has a concentration of 1 mol/L to 15 mol/L.

Furthermore, a frequency of the ultrasonication is 10 kHz to 500 kHz; the nano-porous T coarse powder has a particle size of 1 µm to 500 µm; an internal "ligament" of the nano-porous T coarse powder has a size of 2 nm to 400 nm.

Furthermore, the M includes but is not limited to at least one of elements O, N, and H; the gas reactant containing M includes but is not limited to at least one of air, $O_2$, $N_2$, $NH_3$, $H_2$; the M-ization reaction includes but not limited to at least one of oxidation reaction, nitrogenation reaction, and hydrogenation reaction.

Furthermore, a temperature of the M-ization reaction is 100° C. to 2000° C., the nano-porous T-M coarse powder has a particle size of 1 µm to 600 µm; and an internal "ligament" of the nano-porous T-M coarse powder has a size of 3 nm to 500 nm.

Furthermore, an M-ization rate of the nano-porous T coarse powder is 10% to 100%.

Furthermore, a jet crushing pressure of the jet mill is 0.1 MPa to 2 MPa, and a working temperature is 20° C. to 200° C.; and the selected gas includes but is not limited to at least one of air, nitrogen, an inert gas, and water vapor.

Furthermore, the nano-porous T-M fine powder has a particle size of 0.1 µm to 5 µm; and an internal "ligament" of the nano-porous T-M fine powder has a size of 3 nm to 500 nm.

According to the present disclosure, the method of preparing a nano-porous powder material has the following features:

Firstly, in the precursor alloy, the element T exists by combining with the element A into an intermetallic compound phase or amorphous phase. With the phase structure, during a de-alloying reaction process, the element A in the intermetallic compound or amorphous phase is removed by a corrosion liquid and then the atoms of the element T can form three-dimensional continuous nano-porous T by diffusion rearrangement.

Secondly, the final product nano-porous T-M fine powder can be produced by performing crushing using the jet mill. Since the jet mill cannot directly treat large bulk raw material, it is required to change the raw material of the jet mill into a treatable coarse powder. During a de-alloying reaction process, ultrasonication is performed at the same time to crush the nano-porous structure formed by the de-alloying into a coarse powder fit for treatment by the jet mill.

Thirdly, before the jet mill treats the nano-porous T coarse powder, M-ization treatment is performed on the nanoporous T coarse powder, such that a target material containing M is obtained and the nano-porous T-M coarse powder is embrittled, thus helping jet crushing and fine powder preparation.

Fourthly, the nano-porous powder material prepared by the present disclosure has a particle size of micron level or sub-micron level. However, the interior of the particles is formed by three-dimensional net-shaped nano-porous "ligament" and thus the powder material has a very high specific surface area and permeability and thus has important application prospects in the fields of catalysis, new energy, powder metallurgy, ceramics and photo-electricity and the like.

Therefore, in the method of preparing a nano-porous powder material according to the present disclosure, three key steps "ultrasonically-assisted de-alloying"—"M-ization treatment"—"jet mill treatment" and the like are performed to achieve low-cost mass production of the nano-porous T-M fine powder, bringing broad application prospect.

In order to more clearly set forth the structure features, technical means, and desired objects and functions of the present disclosure, the present disclosure will be further described in detail below in combination with specific embodiments.

BRIEF DESCRIPTIONS OF THE DRAWINGS

FIG. 1 is a transmission electron microscope picture of a nano-porous CuO fine powder according to an embodiment of the present disclosure.

DETAILED DESCRIPTIONS OF EMBODIMENTS

The present disclosure will be further detailed in combination with the specific embodiments. It should be pointed out that the following embodiments are intended to facilitate understanding of the present disclosure rather than limit the present disclosure in any way.

There is provided a method of preparing a nano-porous powder material including the following steps:

at step S1, preparing a precursor alloy $A_xT_y$, where x and y represent atomic percentage contents of various elements, and 0.1%≤y≤50%, x+y=100%; by using an ultrasonically-assisted de-alloying method, removing an element A in the alloy $A_xT_y$ to obtain a primarily-ultrasonicated nano-porous T coarse powder;

at step S2, allowing the nano-porous T coarse powder to contact with a gas containing M under a given temperature to enable all or part of a constituent element T in the nano-porous T coarse powder to perform M-ization reaction with the M to obtain a nano-porous T-M coarse powder;

at step S3, passing the nano-porous T-M coarse powder through a jet mill to undergo secondary crushing to produce a nano-porous T-M fine powder.

In the step S1, in the precursor alloy $A_xT_y$, T includes but is not limited to at least one of Be, B, Si, Ti, V, Cr, Mn, Fe, Co, Ni, Cu, Ge, Zr, Nb, Mo, Ag, Au, Pt, Pd, Hf, Ta, W, Bi; A includes but not limited to at least one of Li, Na, Mg, Al, K, Ca, Zn, Ga, Rb, Sn, Pb, Mn, Fe, Co, Ni, Cu, RE (rare earth element); and in the precursor alloy $A_xT_y$, T exists by combining A into an intermetallic compound phase or amorphous phase. With the phase structure, during a de-alloying reaction process, the element A in the intermetallic compound or amorphous phase is removed by a corrosion liquid and then the atoms of the element T can form three-dimensional continuous nano-porous T by diffusion rearrangement.

Furthermore, the precursor alloy can be obtained in the following manner: weighing alloy raw materials based on a ratio; fully melting the alloy raw materials to obtain an alloy melt, and then preparing the precursor alloy using a rapid solidification method; where a solidification rate of the alloy melt is 0.1 K/s to $10^7$ K/s, and a thickness of the precursor alloy is 5 μm to 50 mm.

The de-alloying method includes but is not limited to acid solution reaction de-alloying and base solution reaction de-alloying. When the acid solution reaction de-alloying is used, an acid solution is at least one of hydrochloric acid, sulfuric acid, nitric acid, phosphoric acid, perchloric acid, and acetic acid, and the acid solution has a concentration of 0.1 mol/L to 20 mol/L; when the base solution reaction de-alloying is used, a base solution is at least one of sodium hydroxide and potassium hydroxide, and the base solution has a concentration of 1 mol/L to 15 mol/L. Specifically, when T is an element resistant to acid corrosion, an acid solution is preferred as a corrosion liquid. When T is an element unresistant to acid solution corrosion, an amphoteric metal Al or Zn is selected as A and a base solution is used as a corrosion liquid to remove A. Based on preparation requirements, the concentrations of the acid and base solutions can be determined based on the corrosion resistances of T and A. The selection basis is that A is removed while the nano-porous T is retained.

A frequency of the ultrasonication is 10 kHz to 500 kHz. It can be predicted that although most particles in the ultrasonicated nano-porous T coarse powder have a particle size of dozens of microns or several hundred microns, they may contain a small amount of fine particles. Thus, the nano-porous T coarse powder has a particle size of 1 μm to 500 μm. An internal "ligament" of the nano-porous T coarse powder is related to the reaction system and reaction parameters (including alloy ingredients, ingredients and concentration of the acid solution, and a reaction temperature). Based on different reaction systems and reaction parameters, the "ligament" has a size of 2 nm to 400 nm.

In the step S2, the M includes but is not limited to at least one of elements O, N, and H; the gas reactant containing M includes but is not limited to at least one of air, $O_2$, $N_2$, $NH_3$, $H_2$; the M-ization reaction includes but not limited to at least one of oxidation reaction, nitrogenation reaction, and hydrogenation reaction.

Under a given temperature, when the nano-porous T coarse powder can perform an oxidation reaction with $O_2$ in the air but not react with other components in the air, an oxidation reaction with the nano-porous T coarse powder can be achieved by using air.

A temperature of the M-ization reaction is 100° C. to 2000° C. After the nano-porous T coarse powder performs the M-ization reaction, the element M combines with the coarse powder by use of a porous structure of the nano-porous T coarse powder. The coarse powder particles and the size of the porous "ligament" will be increased after the M-ization reaction. Therefore, the nano-porous T-M coarse powder has a particle size of 1 μm to 600 μm, and the internal "ligament" of the nano-porous T-M coarse powder has a size of 3 nm to 500 nm.

An M-ization rate of the nano-porous T coarse powder is 10% to 100%. Specifically, when T is one element, part or all of M-ized nano-porous T-M coarse powder can be obtained by controlling M-ization reaction conditions; when T is two or more elements, some elements of T can be wholly or partially M-ized. Since T and M elements are usually combined by covalent bonds, such that the obtained nano-porous T-M coarse powder will be embrittled, helping the subsequent jet mill crushing process.

In step S3,

The nano-porous T-M coarse powder undergoes secondary crushing of the jet mill to produce a nano-porous T-M fine powder. A jet crushing pressure of the jet mill is 0.1 MPa to 2 MPa, and a working temperature is 20° C. to 200° C.; and the selected gas includes but is not limited to at least one of air, nitrogen, an inert gas, and water vapor.

Furthermore, after the brittle nano-porous T-M coarse powder fit for the treatment of the jet mill is obtained by the steps S1 and S2, it can be treated smoothly by the secondary crushing process of the jet mill. The obtained nano-porous T-M fine powder has a particle size of 0.1 µm to 5 µm; and an internal "ligament" of the nano-porous T-M fine powder has a size of 3 nm to 500 nm.

Therefore, in the method of preparing a nano-porous powder material according to the present disclosure, three key steps "ultrasonically-assisted de-alloying"—"M-ization treatment"—"jet mill treatment" and the like are performed to achieve low-cost mass production of the nano-porous T-M fine powder, bringing broad application prospect.

Embodiment 1

This embodiment provides a method of preparing a nano-porous Cu—O powder. The preparation method includes the following steps.

$Mg_{67}Cu_{33}$ precursor alloy was selected. Based on element composition, an alloy was prepared. The alloy was molten fully and then the alloy melt was cooled to room temperature at a solidification rate of $10^5$ K/s to obtain a $Mg_{67}Cu_{33}$ thin ribbon of a thickness of 25 µm, which was mainly composed of $Mg_2Cu$ intermetallic compound. The $Mg_{67}Cu_{33}$ thin ribbon was reacted with a hydrochloric acid aqueous solution of 0.5 mol/L for 30 min under the assistance of 40 kHz ultrasonication to obtain a nano-porous Cu coarse powder of a particle size of 1 µm to 200 µm. The nano-"ligament" had an average diameter of 45 nm.

The nano-porous Cu coarse powder performed a complete oxidation reaction with oxygen in the air at the temperature of 300° C. to produce a nano-porous CuO coarse powder with a particle size of 1 µm to 220 µm. The nano-"ligament" had an average diameter of 50 nm.

The nano-porous CuO coarse powder was further crushed by the jet mill with an air crushing pressure of 1 MPa to finally obtain a nano-porous CuO fine powder of a particle size of 0.1 µm to 3 µm, and the nano-"ligament" had an average diameter of 50 nm as shown in FIG. 1.

Embodiment 2

This embodiment provides a method of preparing a nano-porous Cu—O powder. The preparation method includes the following steps.

$Gd_{82}Al_8Cu_{10}$ precursor alloy was selected. Based on element composition, an alloy was prepared. The alloy was molten fully and then the alloy melt was cooled to room temperature at a solidification rate of $10^5$ K/s to obtain a $Gd_{82}Al_8Cu_{10}$ thin ribbon of a thickness of 25 µm, which was composed of single-phase noncrystals. The $Gd_{82}Al_8Cu_{10}$ amorphous thin ribbon was reacted with a hydrochloric acid aqueous solution of 0.5 mol/L for 30 min under the assistance of 40 kHz ultrasonication to obtain a nano-porous Cu coarse powder of a particle size of 1 µm to 200 µm. The nano-"ligament" had an average diameter of 35 nm.

The nano-porous Cu coarse powder performed a complete oxidation reaction with oxygen in the air at the temperature of 300° C. to produce a nano-porous CuO coarse powder with a particle size of 1 µm to 220 µm. The nano-"ligament" had an average diameter of 40 nm.

The nano-porous CuO coarse powder was further crushed by the jet mill with an air crushing pressure of 1 MPa to finally obtain a nano-porous CuO fine powder of a particle size of 0.1 µm to 2.5 µm, and the nano-"ligament" had an average diameter of 40 nm.

Embodiment 3

This embodiment provides a method of preparing a nano-porous AuCu—O powder. The preparation method includes the following steps.

$Mg_{67}Cu_{30}Au_3$ precursor alloy was selected. Based on element composition, an alloy was prepared. The alloy was molten fully and then the alloy melt was cooled to room temperature at a solidification rate of $10^5$ K/s to obtain a $Mg_{67}Cu_{30}Au_3$ thin ribbon of a thickness of 25 µm, which was composed of $Mg_2Cu(Au)$ intermetallic compound. The $Mg_{67}Cu_{30}Au_3$ thin ribbon was reacted with a hydrochloric acid aqueous solution of 1 mol/L for 30 min under the assistance of 40 kHz ultrasonication to remove the Mg element by de-alloying and obtain a nano-porous Cu(Au) coarse powder of a particle size of 1 µm to 200 µm. The nano-"ligament" had an average diameter of 15 nm.

The nano-porous Cu(Au) coarse powder performed an oxidation reaction with oxygen in the air at the temperature of 300° C. to fully oxidize Cu while Au is not oxidized, to produce a nano-porous CuO(Au) composite coarse powder with a particle size of 1 µm to 210 µm. The nano-"ligament" had an average diameter of 20 nm.

The nano-porous CuO(Au) composite coarse powder was further crushed by the jet mill with an air crushing pressure of 1 MPa to finally obtain a nano-porous CuO(Au) fine powder of a particle size of 0.1 µm to 3 µm, and the nano-"ligament" had an average diameter of 20 nm.

Embodiment 4

This embodiment provides a method of preparing a nano-porous Ti—H powder. The preparation method includes the following steps.

$Fe_{67}Ti_{33}$ precursor alloy was selected. Based on element composition, an alloy was prepared. The alloy was molten fully and then the alloy melt was cooled to room temperature at a solidification rate of $10^5$ K/s to obtain a $Fe_{67}Ti_{33}$ thin ribbon of a thickness of 25 µm, which was composed of $Fe_2Ti$ intermetallic compound. The $Fe_{67}Ti_{33}$ thin ribbon was reacted with a sulfuric acid aqueous solution of 1 mol/L for 30 min under the assistance of 40 kHz ultrasonication to obtain a nano-porous Ti coarse powder of a particle size of 1 µm to 200 µm. The nano-"ligament" had an average diameter of 35 nm.

The nano-porous Ti coarse powder performed a complete hydrogenation reaction with $H_2$ at the temperature of 375° C. to produce a nano-porous Ti—H coarse powder. The nano-"ligament" had an average diameter of 40 nm.

The nano-porous Ti—H coarse powder was further crushed by the jet mill with an air crushing pressure of 1 MPa to finally obtain a nano-porous TiH fine powder of a particle size of 0.1 µm to 3 µm, and the nano-"ligament" had an average diameter of 40 nm.

Embodiment 5

This embodiment provides a method of preparing a nano-porous Ti—N powder. The preparation method includes the following steps.

$Mn_{67}Ti_{33}$ precursor alloy was selected. Based on element composition, an alloy was prepared. The alloy was molten fully and then the alloy melt was cooled to room temperature at a solidification rate of 500 K/s to obtain a $Mn_{67}Ti_{33}$ thin ribbon of a thickness of 1 nm, which was composed of $Mn_2Ti$ intermetallic compound. The $Mn_{67}Ti_{33}$ thin ribbon was reacted with a hydrochloric acid aqueous solution of 2 mol/L for 30 min under the assistance of 40 kHz ultrasonication to obtain a nano-porous Ti coarse powder of a particle size of 1 µm to 200 µm. The nano-"ligament" had an average diameter of 32 nm.

The nano-porous Ti coarse powder performed a complete nitrogenation reaction with $N_2$ at the temperature of 1200° C. to produce a nano-porous Ti—N coarse powder. The nano-"ligament" had an average diameter of 40 nm.

The nano-porous Ti—N coarse powder was further crushed by the jet mill with an air crushing pressure of 0.8 MPa to finally obtain a nano-porous TiN fine powder of a particle size of 0.1 µm to 3 µm, and the nano-"ligament" had an average diameter of 40 nm.

Embodiment 6

This embodiment provides a method of preparing a nano-porous TiZrHf—N powder. The preparation method includes the following steps.

$Mn_{67}Ti_{11}Zr_{11}Hf_{11}$ precursor alloy was selected. Based on element composition, an alloy was prepared. The alloy was molten fully and then the alloy melt was cooled to room temperature at a solidification rate of $10^5$ K/s to obtain a $Mn_{67}Ti_{11}Zr_{11}Hf_{11}$ thin ribbon of a thickness of 25 µm, which was composed of $Mn_2(TiZrHf)$ intermetallic compound. The $Mn_{67}Ti_{11}Zr_{11}Hf_{11}$ thin ribbon was reacted with a hydrochloric acid aqueous solution of 2 mol/L for 40 min under the assistance of 40 kHz ultrasonication to obtain a nano-porous TiZrHf coarse powder of a particle size of 1 µm to 200 µm. The nano-"ligament" had an average diameter of 33 nm.

The nano-porous TiZrHf coarse powder performed a complete nitrogenation reaction with $N_2$ at the temperature of 1200° C. to produce a nano-porous TiZrHf—N coarse powder. The nano-"ligament" had an average diameter of 40 nm.

The nano-porous Ti—N coarse powder was further crushed by the jet mill with an air crushing pressure of 0.8 MPa to finally obtain a nano-porous TiZrHf—N fine powder of a particle size of 0.1 µm to 2.5 µm, and the nano-"ligament" had an average diameter of 40 nm.

Embodiment 7

This embodiment provides a method of preparing a nano-porous Ni—O powder. The preparation method includes the following steps.

$Zn_{80}Ni_{20}$ precursor alloy was selected. Based on element composition, an alloy was prepared. The alloy was molten fully and then the alloy melt was cooled to room temperature at a solidification rate of $10^5$ K/s to obtain a $Zn_{80}Ni_{20}$ thin ribbon of a thickness of 25 µm, which was composed of $Zn_4Ni$ intermetallic compound. The $Zn_{80}Ni_{20}$ thin ribbon was reacted with a NaOH aqueous solution of 5 mol/L for 60 min under the assistance of 40 kHz ultrasonication to obtain a nano-porous Ni coarse powder of a particle size of 1 µm to 100 µm. The nano-"ligament" had an average diameter of 20 nm.

The nano-porous Ni coarse powder performed a complete oxidation reaction with oxygen in the air at the temperature of 200° C. to produce a nano-porous NiO coarse powder of a particle size of 1 µm to 120 µm. The nano-"ligament" had an average diameter of 25 nm.

The nano-porous NiO coarse powder was further crushed by the jet mill with an air crushing pressure of 1.2 MPa to finally obtain a nano-porous NiO fine powder of a particle size of 0.1 µm to 2 µm, and the nano-"ligament" had an average diameter of 25 nm.

The technical features of the above embodiments can be arbitrarily combined. For clarity of descriptions, all possible combinations of the technical features of the above embodiments are not described. But, any combinations of these technical features shall be considered as within the scope recorded in the specification unless in a case of contradiction.

The above embodiments only show several implementations of the present disclosure, and the descriptions are relatively specific and detailed. But, the descriptions shall not be understood as limiting to the present disclosure. It should be pointed out that several variations and improvements made by those skilled in the art without departing from the concept of the present disclosure shall all fall within the scope of protection of the present disclosure. Hence, the scope of protection of the present disclosure shall be indicated by the appended claims.

What is claimed is:

1. A method of preparing a nano-porous powder material, comprising:
    1) preparing a precursor alloy $A_xT_y$, where x and y represent atomic percentage contents of an element A and an element T, respectively, and 0.1%≤y≤50%, x+y=100%; by using an ultrasonically-assisted de-alloying method, removing the element A in the alloy $A_xT_y$ to obtain a primarily-ultrasonicated nano-porous T coarse powder;
    2) allowing the nano-porous T coarse powder to contact with a gas containing M under a given temperature to enable all or part of the element T in the nano-porous T coarse powder to perform M-ization reaction with the M so as to obtain a nano-porous T-M coarse powder;
    3) passing the nano-porous T-M coarse powder through a jet mill to undergo a crushing so as to produce a nano-porous T-M fine powder.

2. The method of claim 1, comprising: weighing alloy raw materials; fully melting the alloy raw materials to obtain an alloy melt and then preparing the precursor alloy using a rapid solidification method; wherein a solidification rate of the alloy melt is 0.1 K/s to $10^7$ K/s, and a thickness of the precursor alloy is 5 µm to 50 mm.

3. The method of claim 1, wherein the de-alloying method comprises at least one of acid solution reaction de-alloying and base solution reaction de-alloying; wherein the acid solution reaction de-alloying comprises using an acid solution of at least one of hydrochloric acid, sulfuric acid, nitric acid, phosphoric acid, perchloric acid and acetic acid with an acid solution concentration of 0.1 mol/L to 20 mol/L; and wherein the base solution reaction de-alloying comprises using a base solution of at least one of sodium hydroxide and potassium hydroxide with a base solution concentration of 1 mol/L to 15 mol/L.

4. The method of claim 1, wherein a frequency of the ultrasonication is 10 kHz to 500 kHz; and the nano-porous T coarse powder has a particle size of 1 μm to 500 μm.

5. The method of claim 1, wherein the M comprises at least one of elements O, N, and H; the gas containing M comprises at least one of air, $O_2$, $N_2$, $NH_3$ and $H_2$; the M-ization reaction comprises at least one of oxidation reaction, nitrogenation reaction, and hydrogenation reaction.

6. The method of claim 1, wherein a temperature of the M-ization reaction is 100° C. to 2000° C., and the nano-porous T-M coarse powder has a particle size of 1 μm to 600 μm.

7. The method of claim 1, wherein an M-ization rate of the nano-porous T coarse powder is 10% to 100%.

8. The method of claim 1, wherein a jet crushing pressure of the jet mill is 0.1 MPa to 2 MPa, and a working temperature is 20° C. to 200° C.; and the gas containing M comprises at least one of air, nitrogen, an inert gas and water vapor.

9. The method of claim 1, wherein the nano-porous T-M fine powder has a particle size of 0.1 μm to 5 μm.

10. A method of preparing a nano-porous powder material, comprising:
1) preparing a precursor alloy $A_xT_y$, where x and y represent atomic percentage contents of an element A and an element T, respectively, and $0.1\% \leq y \leq 50\%$, x+y=100%; by using an ultrasonically-assisted de-alloying method, removing the element A in the alloy $A_xT_y$ to obtain a primarily-ultrasonicated nano-porous T coarse powder;
2) allowing the nano-porous T coarse powder to contact with a gas containing M under a given temperature to enable all or part of the element T in the nano-porous T coarse powder to perform M-ization reaction with the M so as to obtain a nano-porous T-M coarse powder; and
3) passing the nano-porous T-M coarse powder through a jet mill to undergo a crushing so as to produce a nano-porous T-M fine powder, wherein, in the precursor alloy $A_xT_y$, T comprises at least one of Be, B, Si, Ti, V, Cr, Mn, Fe, Co, Ni, Cu, Ge, Zr, Nb, Mo, Ag, Au, Pt, Pd, Hf, Ta, W, Bi; A comprises at least one of Li, Na, Mg, Al, K, Ca, Zn, Ga, Rb, Sn, Pb, Mn, Fe, Co, Ni, Cu, RE (rare earth element).

* * * * *